(12) United States Patent
Wilson

(10) Patent No.: US 6,659,496 B1
(45) Date of Patent: Dec. 9, 2003

(54) TRAILER FOR HAULING RECREATIONAL AND ADVERTISING EQUIPMENT

(75) Inventor: Jeffrey Dean Wilson, New Castle, CA (US)

(73) Assignee: Extreme Engineering, L.L.C., New Castle, CA (US)

( * ) Notice: Subject to any disclaimer, the term of this patent is extended or adjusted under 35 U.S.C. 154(b) by 0 days.

(21) Appl. No.: 09/775,456

(22) Filed: Feb. 2, 2001

Related U.S. Application Data

(60) Provisional application No. 60/179,939, filed on Feb. 3, 2000.

(51) Int. Cl.[7] .................................................. B60P 1/16
(52) U.S. Cl. .......................... 280/656; 414/469; 40/601
(58) Field of Search .................... 40/590, 601; 414/770, 414/778, 469; 298/5, 22 R, 22 P; 482/37; 280/656

(56) References Cited

U.S. PATENT DOCUMENTS

| | | | | |
|---|---|---|---|---|
| 2,696,928 A | * | 12/1954 | Faircloth et al. | |
| 2,828,036 A | * | 3/1958 | White | 280/656 |
| 2,842,423 A | * | 7/1958 | Adams | |
| 3,358,863 A | * | 12/1967 | Griffith et al. | |
| 3,454,251 A | * | 7/1969 | Dye | 280/765.1 X |
| 3,591,230 A | * | 7/1971 | Cramer | 296/23 |
| 3,601,447 A | * | 8/1971 | Kelley | 298/14 |
| 3,608,668 A | | 9/1971 | Mahaney | 182/2 |
| 3,905,644 A | | 9/1975 | Feterel | 298/22 AE |
| 4,087,785 A | * | 5/1978 | Dodich | 40/590 |
| 4,239,258 A | | 12/1980 | Burris | 280/639 |
| 4,286,800 A | | 9/1981 | Lomas | 280/414 B |
| 4,593,265 A | * | 6/1986 | McKenney | 40/590 |
| 4,602,399 A | | 7/1986 | Jenkins | 14/2.4 |
| 5,092,623 A | * | 3/1992 | Swanner | 280/638 |
| 5,228,534 A | | 7/1993 | Haroldson, Sr. | 182/63 |
| 5,297,652 A | | 3/1994 | Armond et al. | 182/63 |
| 5,383,714 A | * | 1/1995 | Hunter | 298/22 R |
| 5,862,827 A | | 1/1999 | Howze | 135/901 |
| 5,957,538 A | * | 9/1999 | Sullivan | 298/17.5 |
| 6,017,081 A | | 1/2000 | Colby | 296/173 |
| 6,083,142 A | * | 7/2000 | Wilson | 482/37 |

OTHER PUBLICATIONS

Web Page: Portable Wall Information for Climb Time Indoor Rock Climbing Gym, Created Nov. 25, 2000.*
Web Page: The Edge Climbing Wall Systems.*
Web Page: Portable Climbing Wall for Rent.*

* cited by examiner

Primary Examiner—Avraham Lerner
(74) Attorney, Agent, or Firm—Sierra Patent Group, Ltd.

(57) ABSTRACT

A trailer with a base having a front, a rear, and an axle. An upper frame pivotably coupled to the base frame and longer than the base frame. A towing tongue is coupled to the front of the upper frame.

8 Claims, 6 Drawing Sheets

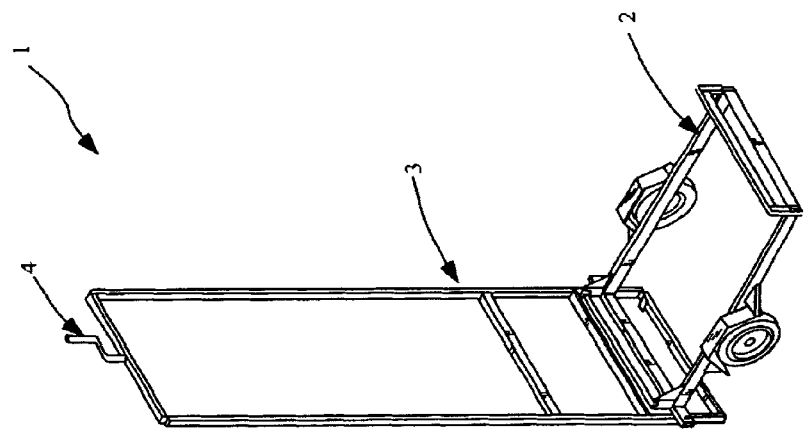
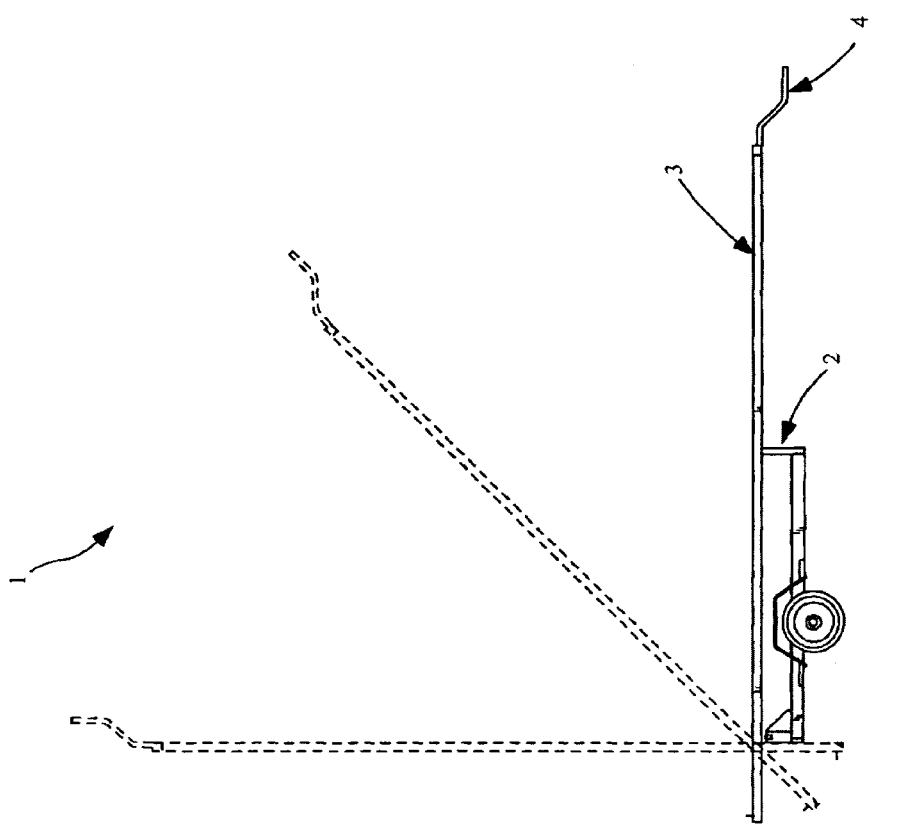

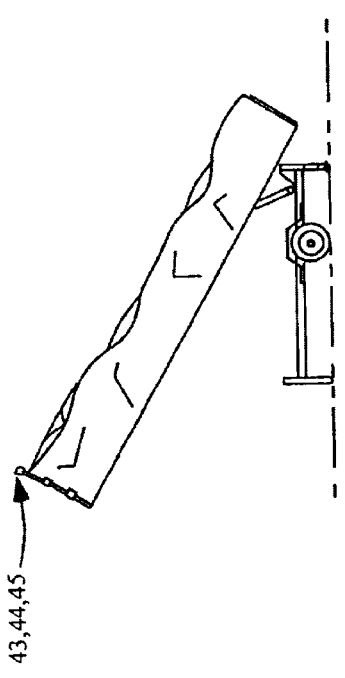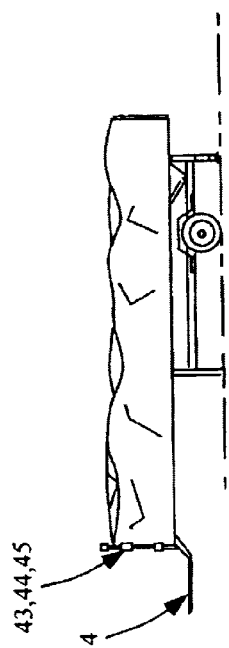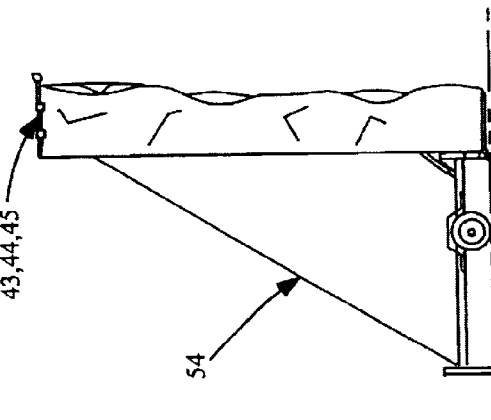

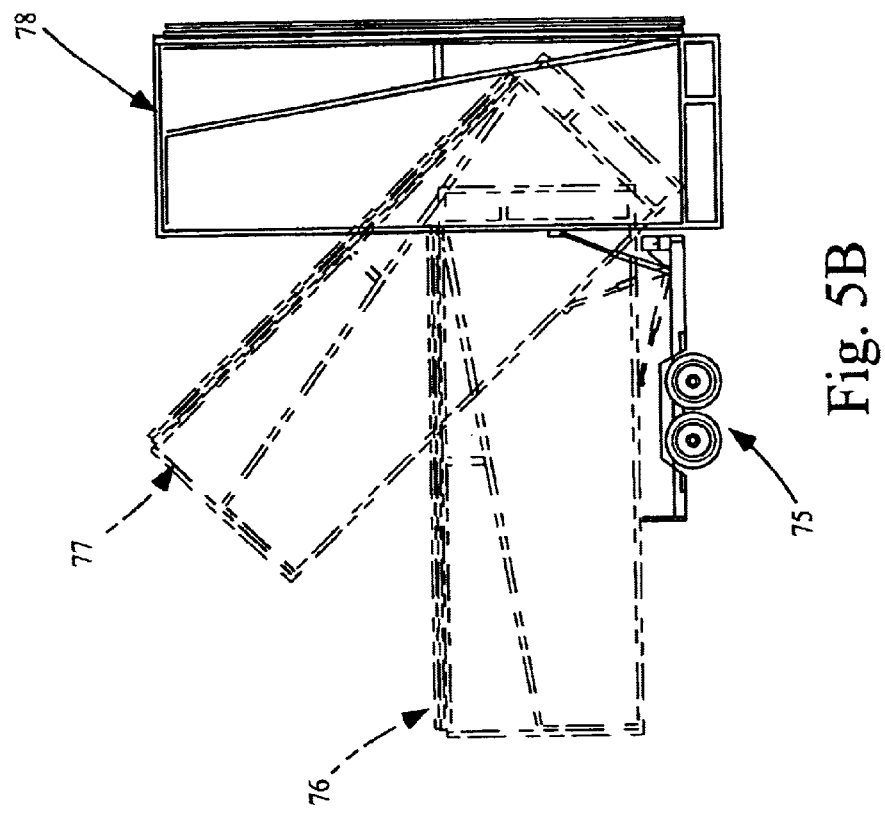
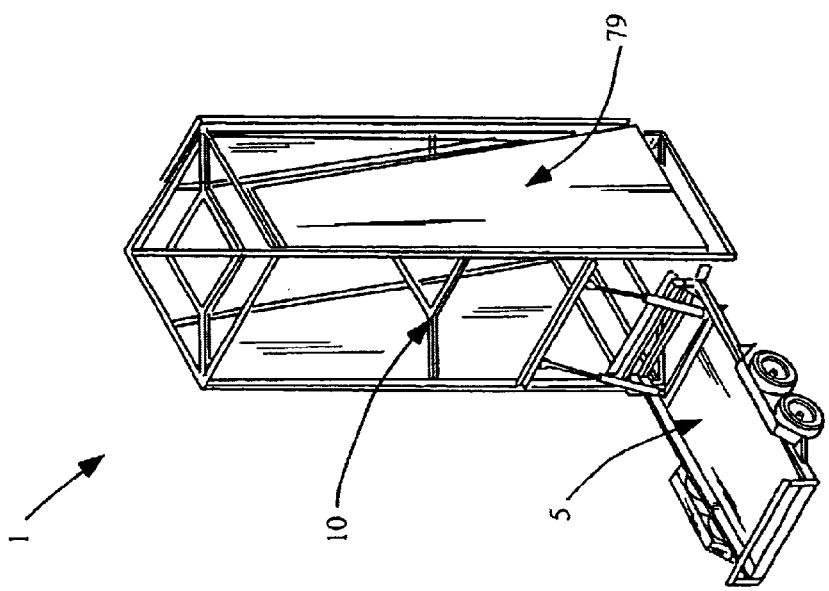

TRAILER FOR HAULING RECREATIONAL AND ADVERTISING EQUIPMENT

CROSS REFERENCE TO RELATED APPLICATIONS

This application claims benefit of U.S. Provisional Application No. 60/179,939, filed Feb. 3, 2000.

BACKGROUND OF THE INVENTION

1. Field of the Invention

The present invention relates generally to the hauling of recreational equipment or advertising material. More particularly, the present invention describes a compact and efficient stubby trailer for the transport and site set-up of climbing walls, rappel towers and other amusement or resort ride platforms.

2. The Background Art

The prior art trailers are bulky and lengthy and take up an inordinate amount of space, often relative to what they are used to transport. Due to the size of the trailer itself, often a larger vehicle is required to accommodate the weight of the trailer. Additionally, often prior art trailers provide no synergy with the object being hauled.

SUMMARY OF THE INVENTION

A trailer with a base having a front, a rear, and an axle. An upper frame pivotably coupled to the base frame and longer than the base frame. A towing tongue is coupled to the front of the upper frame.

The trailer maybe used for transport and site set-up of climbing walls, repel towers and other amusement or resort ride platforms. Bill boards and other advertisement platforms can also be transported and set-up with the present invention.

The trailer is ideally suited for use in locations where rental fees are charged by the square foot, such as trade shows, amusement parks. The present invention provides for more efficient hauling and site set up. During transport its compact size can accommodate large platform lengths and can be towed by smaller vehicles. The platform itself can be designed to lay neatly on top and even fold about the stubby trailer for transport, and folded side wings of a platform structure such as the three person repel tower can be utilized by the placement of advertisement. For set-up at the site location, the climbing platform can be raised via an articulating and the use of hydraulic lifts, and then secured into a vertical and stable position. A significant advantage results from the small footprint when in the raised position-saving space and cost of the amusement/resort park site.

The trailer has a tongue attached to the upper portion of the trailer rather than to the traditional base that allows for the hauling of materials much longer than the stubby trailer. The trailer is a completely self contained unit which may include a built in carrying tray to carry all the items needed for set up at the final location. Once on location the equipment can be opened and set up in a space much smaller than the length of the recreational or advertising equipment.

BRIEF DESCRIPTION OF THE DRAWINGS

FIG. 1a is a side view of the trailer showing the base in various position via dotted line.

FIG. 1b is an isometric view of a trailer with the support base in the upright position.

FIG. 4(4a–4d) are side views of the trailer of the climbing structure in various position from down (FIG. 4a) to fully upright (FIG. 4d).

FIG. 5a is an isometric view of the trailer and tower in upright position.

FIG. 5b is a side view of the transportable tower and trailer with the transportable tower being lifted to a vertical position.

DETAILED DESCRIPTION OF A PREFERRED EMBODIMENT

Figure 2:
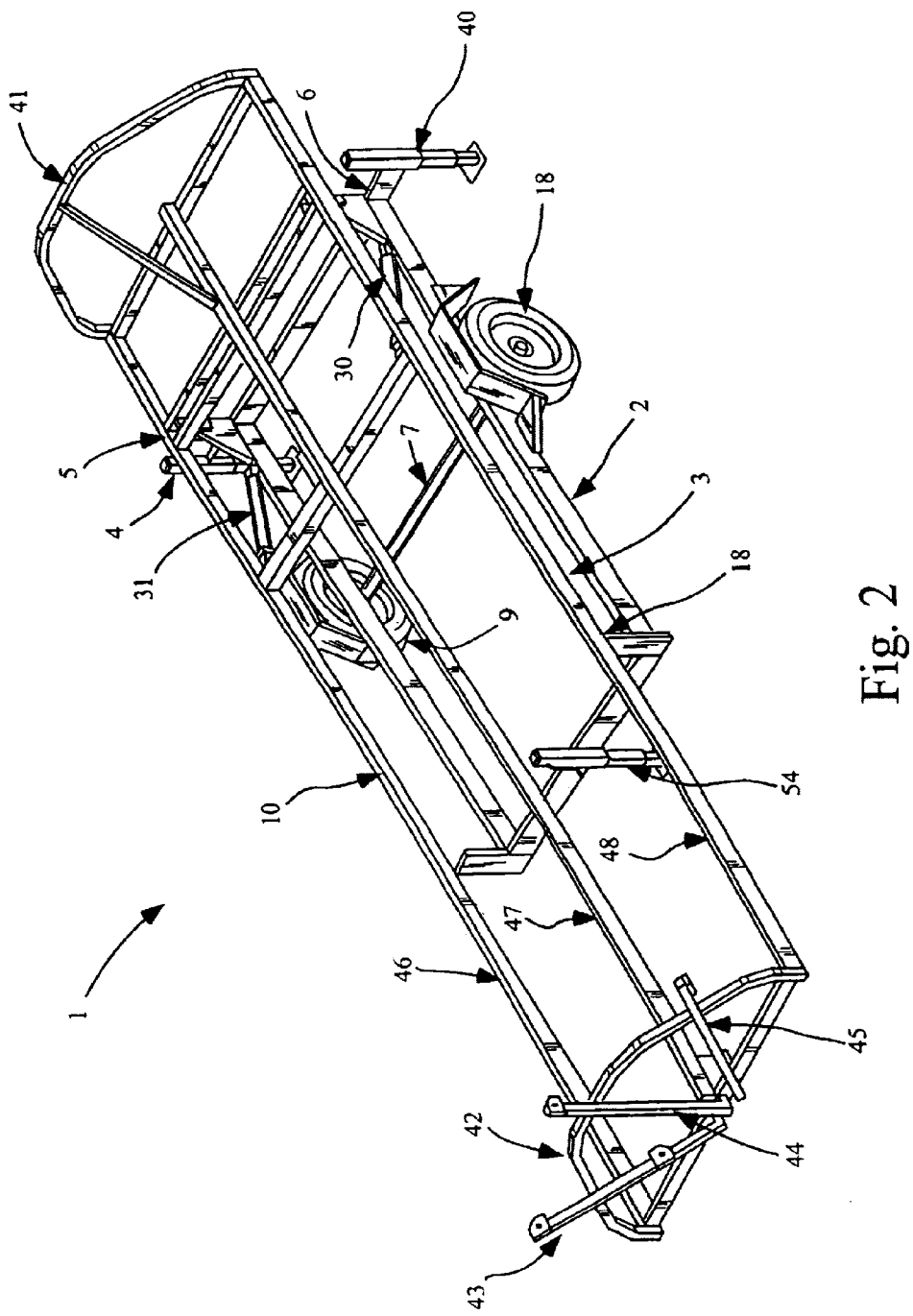
FIG. 2 is an isometric view of the trailer with the substructure of the base attached thereto.

Those of ordinary skill in the art will realize that the following description of the present invention is illustrative only and not in any way limiting. Other embodiments of the invention will readily suggest themselves to such skilled persons.

FIG. 1a embodies the innovative trailer 1 with the base frame 2 on which the longer upper frame 3 is resting in the nested position. The base frame trailer 2 length is within one-third to one-half of the total transported structure length, and the design and placement takes into account wind loading and counterbalance. The FIGS. 1a further shows the upper frame 3 in several elevating positions. Also, FIGS. 1b shows the upper frame 3 in the fully vertical raised position perpendicular to the base frame 2. FIGS. 1a and 1b also shows the towing tongue 4 attached to the front of the upper frame 3. Placing the towing tongue 4 at the front of the upper frame 3 rather than the traditional tongue attached to a long base frame provides a weight savings and allows the trailer to be towed by a smaller vehicle and also a space saving ideal for tradeshows and recreational events where space is rented by the square foot.

Shown in FIG. 2 is a perspective view of the trailer 1 with the base frame 2 on which the longer upper frame 3 is resting in the nested position. The trailer base frame 2 includes a pivot point 5 at the rear 6 and a front support 7 and an axle 8 attached transversely between pivot point 5 at the back end and a front support 7 and a set of wheels 9 and 10 attached at opposite ends of the axle 8. The stabilizing arms 11, which can be extended and telescope down to contact the ground, are attached to the rear of the base frame 2 for increased stability of the upper frame 3 when it is disposed in its lifted vertical position.

The upper frame 3 is supported in the nested position by the pivot point 5 at the back end and a front support 7. The upper frame 3 is raised to the vertical position by lifting mechanisms 30 and 31 which are coupled to the rear of the base frame 2 and to the upper frame 3 cross support 42. The upper frame 3 lends itself to being raised about the pivot point 5 using many varieties of lifting mechanisms 30 and 31 including but not limited to: electric actuator or servo, pre-loaded gas assist shock type, hydraulic actuator, or even by a human powered wench-pull.

In this embodiment attaching members 41 and 42 can be used to mount a climbing wall that can be raised at the final set up location. The pulley arms 43, 44 and 45 are used to run the ropes through pulleys which keep three climbers or rappelers safely separated which the climbers will tie into as a safety precaution.

Further, in this embodiment the longitudinal members 46, 47, and 48 are the main method for transferring the towing load through the upper frame 3 through the pivot point 5 through the base frame 2. As previously discussed in FIGS. 1a and 1b, by placing the towing tongue 4 at the front of the upper frame 3 and transferring the loads through the upper frame 3 through the pivot point 5 through the base frame 2 rather than the traditional tongue attached to a long heavy base and transferring the loads directly through the long heavy base creates a weight savings making the trailer towable by a smaller vehicle such as a minivan as opposed to a larger three-quarter Ton or a full one ton vehicle and avoiding this unnecessary expense. Also, this design creates a large space saving in relationship to the article which is mounted to the upper frame 3 when it is completely raised to the vertical position ideal for tradeshows and recreational events where space is rented by the square foot, requiring only rental of enough square footage to accommodate the much shorter base frame 2, which those of ordinary skill in the art will realize is significantly less space than the needs of the prior art trailers.

Figure 3:
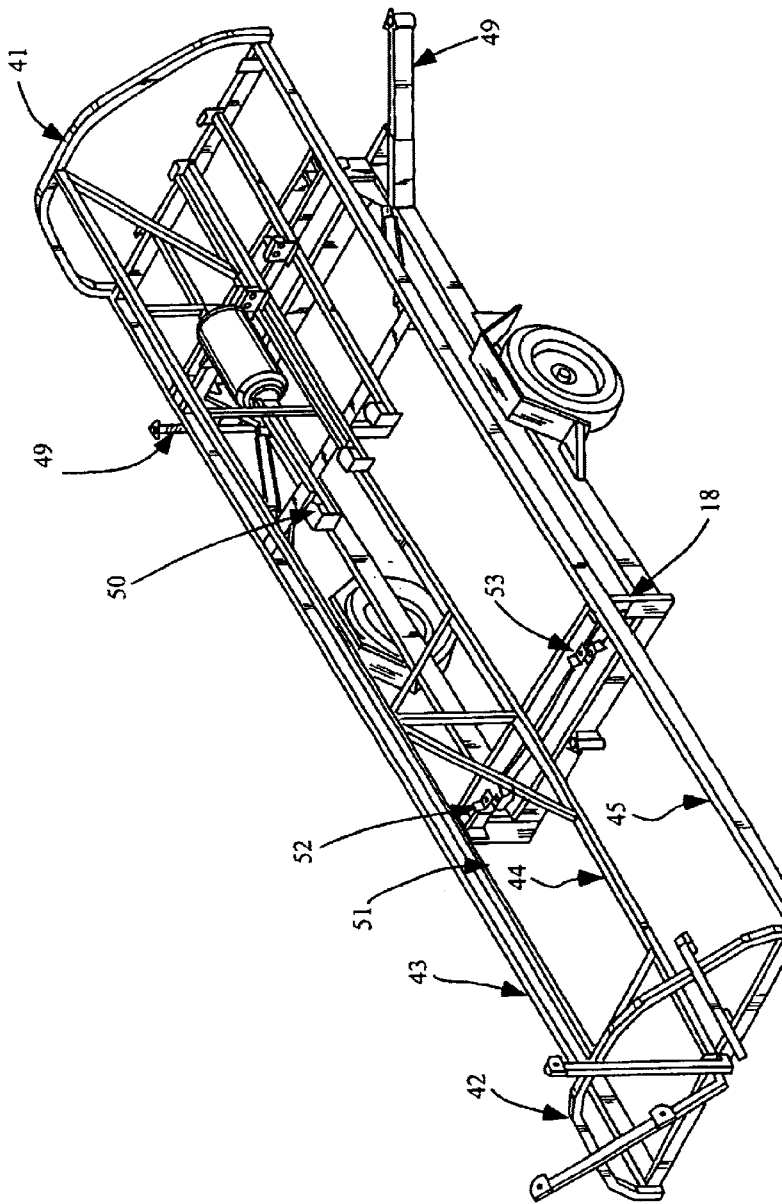
FIG. 3 is an isometric view of the trailer with the substructure of the base attached thereto.

FIG. 3 further describes a trailer with rotatable support arms 49 that increases the stability of the equipment can be increased by rotating the support arms 49 to the extended position and telescope down to contact the ground, are attached to the rear of the base frame 2 for increased stability of the upper frame 3 when lifted to the vertical position. The mounting brackets 50 upon which equipment used in the climbing version and the rappelling version of the trailer can be mounted. Also shown are safety brackets 52 and 53, which are connected to both the upper frame 3 and to the shorter base frame 2, are used in the nested or traveling position to secure the upper frame 3 to the shorter base frame 2 at a front support 7 to ensure that the trailer will stay in the nested position during transportation. The safety brackets 52 and 53 are also used in the complete vertical raised position perpendicular to the base frame 2, to secure the upper frame 3 and to the shorter base frame 2 to increase the stability of the completely raised trailer unit. The front support 54 is attached to the front of base frame 2. The front support 54 is used for stabilizing and supporting the trailer when in a parked or stored position. The front support 54 can further be used in conjunction with the with rotatable support arms 49 or the extendable stabilizing arms 11 (from FIG. 2) to stabilize the trailer when the upper frame 3 is in the fully raised position. Those of ordinary skill in the art will further realize that the fully raised climbing wall will also be fully supported by the attaching members 41 and longitudinal members 43, 44, 45 and 51 under the load of climbers.

A short transporting trailer or stubby-type, is an innovative improved design for transport of the climbing walls as shown in FIG. 4 in general. The climbing wall version of the trailer is shown in the parked or stored position in FIG. 4a with the towing tongue 4 installed and ready to be mounted to a pulling means. FIG. 4b and 4c show the climbing wall in different states of being raised by the lifting mechanism 30 and 31. Illustrated in FIG. 4d is the climbing wall in its fully raised version with a safety cable 54 attaching the base frame 2 and to the upper frame 3 for greater stability.

Another feature is that the pulley arms 43, 44 and 45, which are used to run the ropes through pulleys which keep three climbers or rappelers safely separated which the climbers will tie into as a safety precaution, are already installed in the nested position and eliminates the need to install the ropes when the upper frame 3 is in the fully raised position.

Figure 6A:
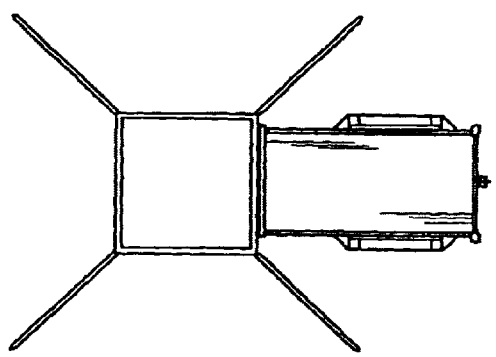
FIG. 6 are different views of trailer/tower combination with the tower in the upright and raised position.
Figure 6B:
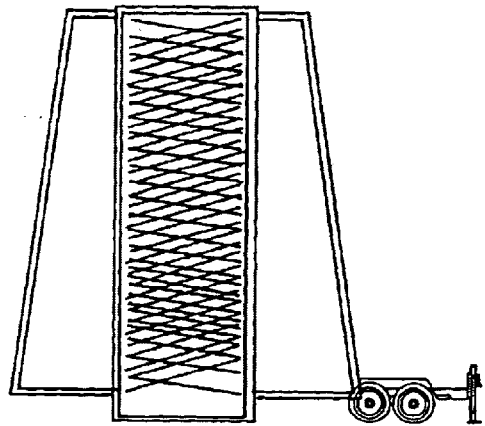
Figure 6C:
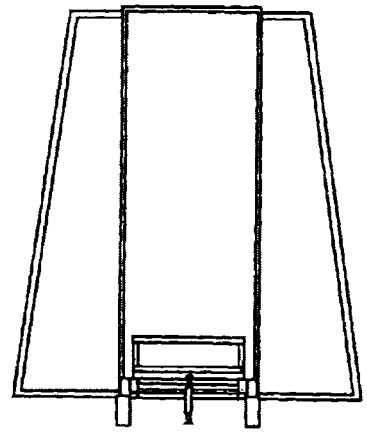

FIG. 5a illustrates the trailer carrying a rappelling tower is in its fully raised position. FIG. 5b illustrates the tower, with a four wheel 75 design, in both a nested or transporting position 77, in a transition position 78, and finally in the complete upright position. Further as can be seen in FIG. 5a the wings 79 can be folded in for ease of transportation. Those of ordinary skill in the art will realize that this embodiment can be used to carry greater weights. FIG. 6a, 6b, and 6c display the rappel tower fully in the fully raised position with all of the. Those of ordinary skill in the art will realize that this embodiment shows that the required depth of the rental space would be in excess While embodiments and applications for this present invention have been shown and described, it would be apparent to those skilled in the art that many more modification than mentioned above are possible without departing from the inventive concepts herein. The invention, therefore, is not to be restricted except in the spirit of the appended claims.

What is claimed is:

1. A trailer for hauling equipment, comprising:

a base frame having a front and a rear;

an axle coupled to said base frame;

an upper frame having a front and a rear and having a length greater than said base frame said upper frame pivotably coupled to said rear of said base frame, said front end of said upper frame extending beyond the front end of said base frame; and a towing tongue coupled to said front of said upper frame.

2. A trailer as in claim 1 further comprising:

a lifting mechanism coupled to said base frame and to said upper frame to raise and secure.

3. A trailer as in claim 1 or 2 wherein wheels are rotatably mounted on said axle.

4. A trailer as in claim 3 further comprising:

stabilizing arms attached to said base frame at said back end such that the said upper frame and said subject matter are more stable when raised to a useful position.

5. A trailer as in claim 4 further wherein:

said stabilizing arms are rotatably attached to said base frame at said back end.

6. A trailer as in claim 1 further comprising advertising material on said upper frame.

7. A trailer as in claim 1 further comprising a climbing wall on said upper frame.

8. A trailer as in claim 1 further comprising rappel tower a climbing wall on said upper frame.

* * * * *